United States Patent
Bussmann et al.

(10) Patent No.: US 9,706,714 B2
(45) Date of Patent: Jul. 18, 2017

(54) INLET HEAD HOUSING FOR AN AXIAL SEPARATING DEVICE

(71) Applicant: CLAAS SELBSTFAHRENDE ERNTEMASCHINEN GMBH, Harsewinkel (DE)

(72) Inventors: Jens Bussmann, Ostercappeln (DE); Bernd Holtmann, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 75 days.

(21) Appl. No.: 14/794,108

(22) Filed: Jul. 8, 2015

(65) Prior Publication Data
US 2016/0007536 A1    Jan. 14, 2016

(30) Foreign Application Priority Data

Jul. 10, 2014    (DE) .................... 10 2014 109 702

(51) Int. Cl.
| | |
|---|---|
| *A01F 12/10* | (2006.01) |
| *A01F 12/395* | (2006.01) |
| *A01F 7/06* | (2006.01) |
| *A01D 41/12* | (2006.01) |

(52) U.S. Cl.
CPC .......... *A01F 12/395* (2013.01); *A01D 41/12* (2013.01); *A01F 7/06* (2013.01); *A01F 7/067* (2013.01)

(58) Field of Classification Search
CPC ............. A01F 7/06; A01F 12/10; A01F 12/00

USPC .................. 460/70, 80, 68, 69, 16
See application file for complete search history.

(56) References Cited

U.S. PATENT DOCUMENTS

| | | | | |
|---|---|---|---|---|
| 3,626,472 A | * | 12/1971 | Rowland-Hill | A01F 7/06 460/70 |
| 3,828,793 A | * | 8/1974 | Gochanour | A01F 12/00 460/70 |
| 3,994,304 A | * | 11/1976 | Todd | A01F 12/10 460/70 |
| 4,291,709 A | * | 9/1981 | Weber | A01F 7/06 460/70 |
| 4,611,605 A | * | 9/1986 | Hall | A01F 7/06 460/80 |

(Continued)

FOREIGN PATENT DOCUMENTS

| | | |
|---|---|---|
| EP | 0 230 276 | 7/1987 |
| EP | 1 147 701 | 10/2001 |

(Continued)

*Primary Examiner* — Árpád Fábián-Kovács
(74) *Attorney, Agent, or Firm* — Michael J. Striker

(57) ABSTRACT

An inlet head housing for an axial separating device includes a pair of separating rotors arranged parallel to one another having a first end protruding, in sections, into the inlet head housing. The inlet head housing also includes flat inlet sections extending along a width of each of the respective separating rotors and a ramp-shaped housing section having a substantially concave profile is arranged between the flat inlet sections. The housing section at least partially supports a separation of a crop flow into two partial flows to the separating rotors and a substantially blade-shaped separating element is arranged on the ramp-shaped housing section and extends substantially axially parallel thereto.

14 Claims, 4 Drawing Sheets

(56) References Cited

U.S. PATENT DOCUMENTS

| | | | | |
|---|---|---|---|---|
| 4,739,773 A * | 4/1988 | West | A01F 12/442 | 460/113 |
| 4,875,890 A * | 10/1989 | Margerum | A01F 7/06 | 198/612 |
| 5,334,093 A * | 8/1994 | Jensen | A01F 12/442 | 460/107 |
| 5,342,239 A * | 8/1994 | West | A01F 12/22 | 460/110 |
| 5,344,367 A * | 9/1994 | Gerber | A01F 12/10 | 460/68 |
| 5,556,337 A * | 9/1996 | Tophinke | A01F 12/442 | 460/70 |
| 6,129,629 A * | 10/2000 | Dammann | A01F 12/442 | 460/67 |
| 6,517,431 B2 | 2/2003 | Schwersmann | | |
| 6,780,102 B2 * | 8/2004 | Visagie | A01F 12/442 | 460/46 |
| 7,462,101 B2 * | 12/2008 | Grywacheski | A01F 12/20 | 460/119 |
| 8,062,109 B1 * | 11/2011 | Pearson | A01D 41/1252 | 460/59 |
| 8,109,815 B2 * | 2/2012 | Hollatz | A01F 7/067 | 460/16 |
| 8,118,652 B2 * | 2/2012 | Hollatz | A01F 7/06 | 460/113 |
| 8,556,690 B2 * | 10/2013 | Bojsen | A01F 7/067 | 460/68 |
| 2002/0045469 A1 * | 4/2002 | Schwersmann | A01F 7/06 | 460/70 |
| 2002/0086721 A1 * | 7/2002 | Schwersmann | A01F 12/10 | 460/68 |

FOREIGN PATENT DOCUMENTS

| | | |
|---|---|---|
| EP | 2 574 231 | 4/2013 |
| WO | WO 2010/086063 | 8/2010 |

* cited by examiner

INLET HEAD HOUSING FOR AN AXIAL SEPARATING DEVICE

CROSS-REFERENCE TO A RELATED APPLICATION

The invention described and claimed hereinbelow is also described in German Patent Application DE 10 2014 109 702.5, filed on Jul. 10, 2014. The German Patent Application, the subject matter of which is incorporated herein by reference, provides the basis for a claim of priority of invention under 35 U.S.C. 119(a)-(d).

BACKGROUND OF THE INVENTION

The present invention relates to an inlet head housing for a pair of axial separating rotors.

Document WO 2010/086063 A1 makes known an inlet head housing and a self-propelled combine harvester. The combine harvester comprises an axial separating device having a pair of separating rotors, which are arranged with one end thereof in the inlet head housing. A flat inlet section is located in a region in front of the openings of the separating rotors in each case, through which crop is fed to the respective separating rotor. The crop is fed by a tangentially conveying impeller, which is arranged above the inlet section of the openings of the separating rotors. Given that the separating rotors are spaced apart from one another, the inlet head housing has a ramp-shaped housing section, the width of which substantially corresponds to the distance between the two separating rotors. This ramp-shaped housing section, which rises in the vertical direction, has a concave profile and is used for support when the fed crop is separated, in order to evenly load the separating rotors with crop. A deflection element is arranged above the ramp-shaped housing section, on the side of the inlet head housing opposite the inlet sections. The deflection element redirects the crop in the circumferential direction of the impeller that is not separated by the ramp-shaped housing section, but rather is pushed upward along the surface of the housing section. The crop redirected by the deflection element arrives in front of or on top of the impeller, which combines this crop with crop that is newly picked up by the combine harvester. The crop is then fed back to the separating rotors.

The disadvantage of this deflection element is that the crop that could not be separated by the ramp-shaped housing section between the separating rotors due to moisture or straw length is fed back to the feed roller, in order to be separated in at least one more feed attempt. This procedure results in a loading of the impeller that is not inconsiderable.

SUMMARY OF THE INVENTION

The present invention overcomes the shortcomings of known arts, such as those mentioned above.

To that end, the present invention provides an inlet head housing for an axial separating device and a combine harvester, which is provides an improved separation of the crop flow before the crop flow enters the axial separating device.

According to an embodiment, an inlet head housing for an axial separating device is provided that includes a pair of separating rotors arranged parallel to one another having a first end protruding, in sections, into the inlet head housing. The inlet head housing has flat inlet sections that extend along a width of the respective separating rotors. Between the flat inlet sections, a ramp-shaped housing section with a substantially concave profile is arranged. The housing section at least partially supports a separation of a crop flow into two partial flows to be fed to the separating rotors (8). A substantially blade-shaped separating element is arranged on the ramp-shaped housing section and extends axially parallel thereto.

The separating element acts like a cutting lip on the crop such that the effect of the ramp-shaped housing section is substantially improved when separating the crop, which is pressed against the separating element. The separating element has a contour that corresponds to the housing section. The separating element can be arranged directly on the ramp-shaped housing section. In one form, the separating element is detachably fastened on the housing section. As a result, the ramp-shaped housing section is easily replaced or retrofitted with the separating element.

Preferably, a wedge-shaped projection can be arranged on the ramp-shaped housing section, which is used to accommodate the separating element. The separating element can be detachably fastened on the projection. The wedge-shaped projection can have an increasing width in the longitudinal direction. The additional projection on the housing section supports the lateral deflection of the separated crop to the openings of the separating rotors given that the width of said projection changes in the longitudinal direction.

In addition, the separating element can extend, in sections, along the width of the projection. The separating element can have a base for fastening on the projection and can be designed to be uniform or abruptly tapering in the axial direction such that said separating element leads into a type of cutting lip.

In particular, the separating element can extend, at least in sections, in the longitudinal direction of the housing section.

Preferably, the separating element can have a profiled separating edge. This separating edge can vary depending on the crop type and crop conditions. In particular, due to the retrofittability and the associated replaceability, the separating element can therefore be replaced when this is required due to the crop conditions.

The separating edge can have a profile formed of a plurality of at least partially curved sections. An advantage of this profile is that straw can be prevented from becoming clamped between the sections.

As an alternative, the separating edge can have a saw tooth-shaped profile. This profile acts more aggressively on the crop to be separated. Preferably, the separating edge can have a profile formed of a plurality of polygons.

Advantageously, the height of the profiling can decrease in the longitudinal direction of the separating element. This embodiment takes into account the fact that more crop to be separated arrives in the lower region of the ramp-shaped housing section or the projection than in the upper region, in which the amount of crop to be separated decreases.

In addition, the invention relates to a self-propelled combine harvester that includes the inventive inlet head.

Preferably, a tangentially arranged impeller is assigned to the inlet head housing, which has V-shaped guide plates arranged in the circumferential direction, in the central region of said impeller. The guide plates extend radially outwardly proceeding from the circumferential surface of the impeller. The guide plates are designed to taper in the direction of rotation of the impeller.

Advantageously, the guide plates can have profiling on the outer edge thereof. This profiling can be designed to correspond to the profiling of the separating element. This arrangement is advantageous, since the profiling on the outer edges of the guide plates of the rotating impeller can interact with the separating element, which functions as a type of counter blade.

In this context, the profiling can be machined into the outer edge of the guide plate.

As an alternative, the profiling can be provided on an outer edge of the profiled plate, which is detachably fastened on the guide plate. The profiled plate can be designed as a part subject to wear, which can be replaced due to the detachable fastening on the guide plate. The profiled plate can substantially correspond to the shape and the dimensions of the guide plate.

BRIEF DESCRIPTION OF THE DRAWINGS

Further features and advantages of the invention will become apparent from the description of embodiments that follows, with reference to the attached figures, wherein:

FIG. 2b s presents a side view of the inlet head housing according to FIG. 2a.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
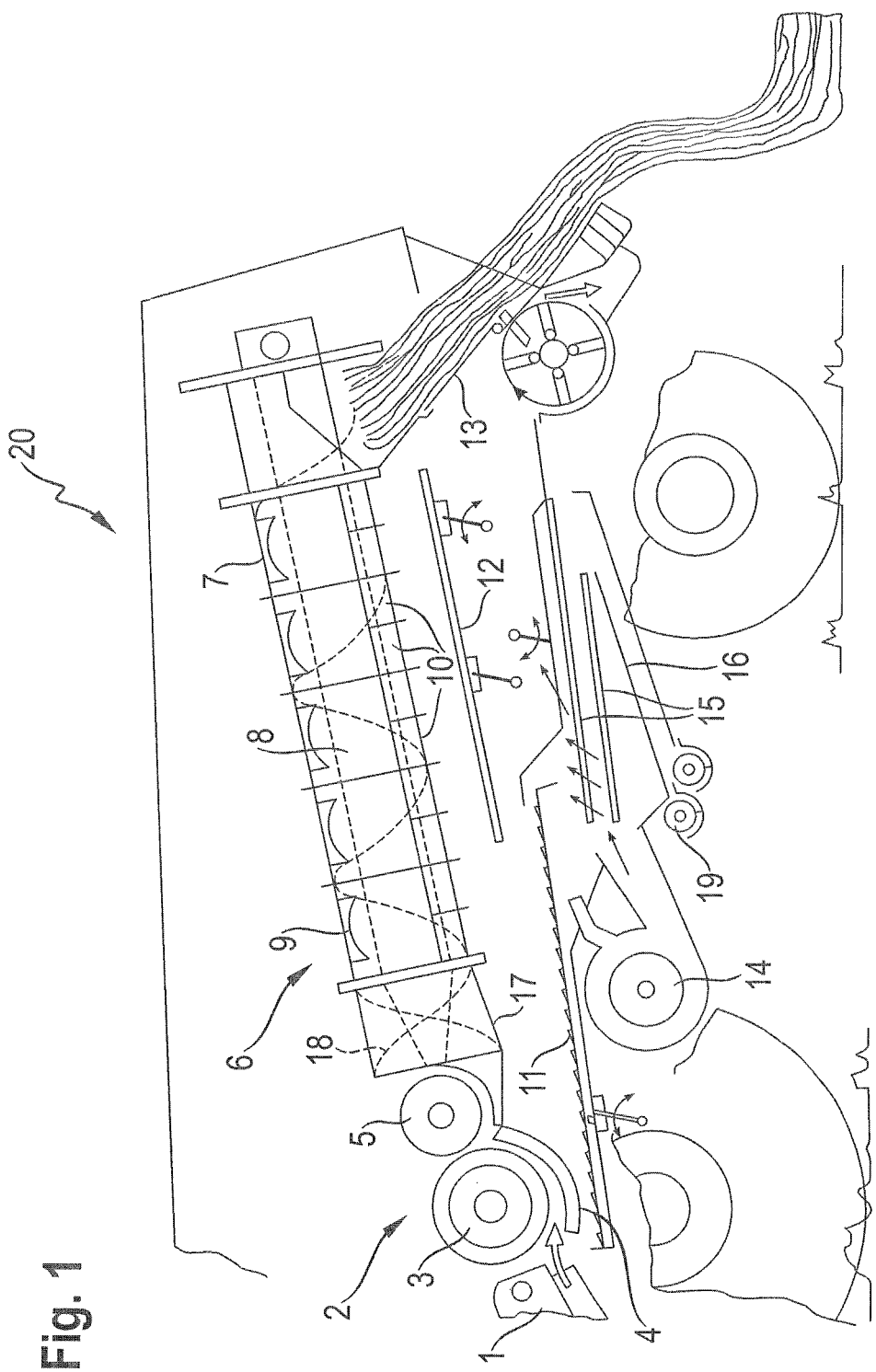
FIG. 1 presents a schematic view of a self-propelled combine harvester.

The illustration in FIG. 1 depicts a schematic longitudinal section through a rear region of a combine harvester 20. Crop to be processed is picked up in the non-illustrated front region of the combine harvester 20 and is fed by a feeder 1, which is only partially depicted, to a tangentially acting threshing unit 2. The threshing unit 2 comprises a threshing drum 3 having an axle, which is oriented transversely to the direction of travel of the combine harvester 20 and which is enclosed by a threshing concave 4 on a portion of the circumference thereof. A partial flow of the crop processed by the threshing unit 2 passes through openings in the threshing concave 4 and reaches a grain pan 11 located thereunder.

A larger partial flow of the crop, however, is conveyed between the threshing drum 3 and the threshing concave 4 and, with assistance from a guide drum or an impeller 5, is fed to an axial separating device 6. The schematically depicted axial separating device 6 is designed as at least one cylindrical housing 7, which is open at the ends thereof, and in which axial separating rotors 8 designed as a feed device are supported along the entire length thereof in a rotationally drivable manner. By way of the opposing rotation of the axial separating rotors 8, the crop is conveyed on a helical trajectory through the axial separating device 6. Kneading of the crop is promoted by ribs 9 projecting from a top side of the housing 7 into the interior thereof when the outer edge of the helix 18 of the axial separating rotor 8 moves past the ribs. The lower region of the housing 7 is formed by separation concaves 10. The front end of the axial separating rotor 8 extends into an inlet head housing 17, which is depicted in greater detail in FIGS. 2a and 2b.

The components of the partial flow that are delivered by the axial separating device 6, grain, chaff and fine straw, which are ejected out of the axial separating device 6 through openings of the separation concaves 10, drop onto the grain pan 11 located thereunder or onto a return pan 12.

The coarse straw, from which grain has been largely removed during passage through the axial separating device 6, is ejected at the rear end of the axial separating device 6 and drops through a chute 13 onto the ground. The threshing unit 2 and the axial separating device 6 therefore effect a first separating step or separation step in the harvesting operation.

To effect a second separating step or cleaning step, the combine comprises a fan 14 and a group of perforated floors 15 located in the airflow of the fan 14. The group of perforated floors 15 is driven in an oscillating manner by a frame structure, which is not shown. The perforated floors are loaded with the pre-cleaned partial flow. The grain contained in the pre-cleaned partial flow drops through the oscillating perforated floors 15 onto a slanted first guide pan 16. A conveyor auger 19 is arranged at the lower end of the guide pan 16, which conveys the grain to an elevator and, by way thereof, into a grain tank.

Figure 2A:
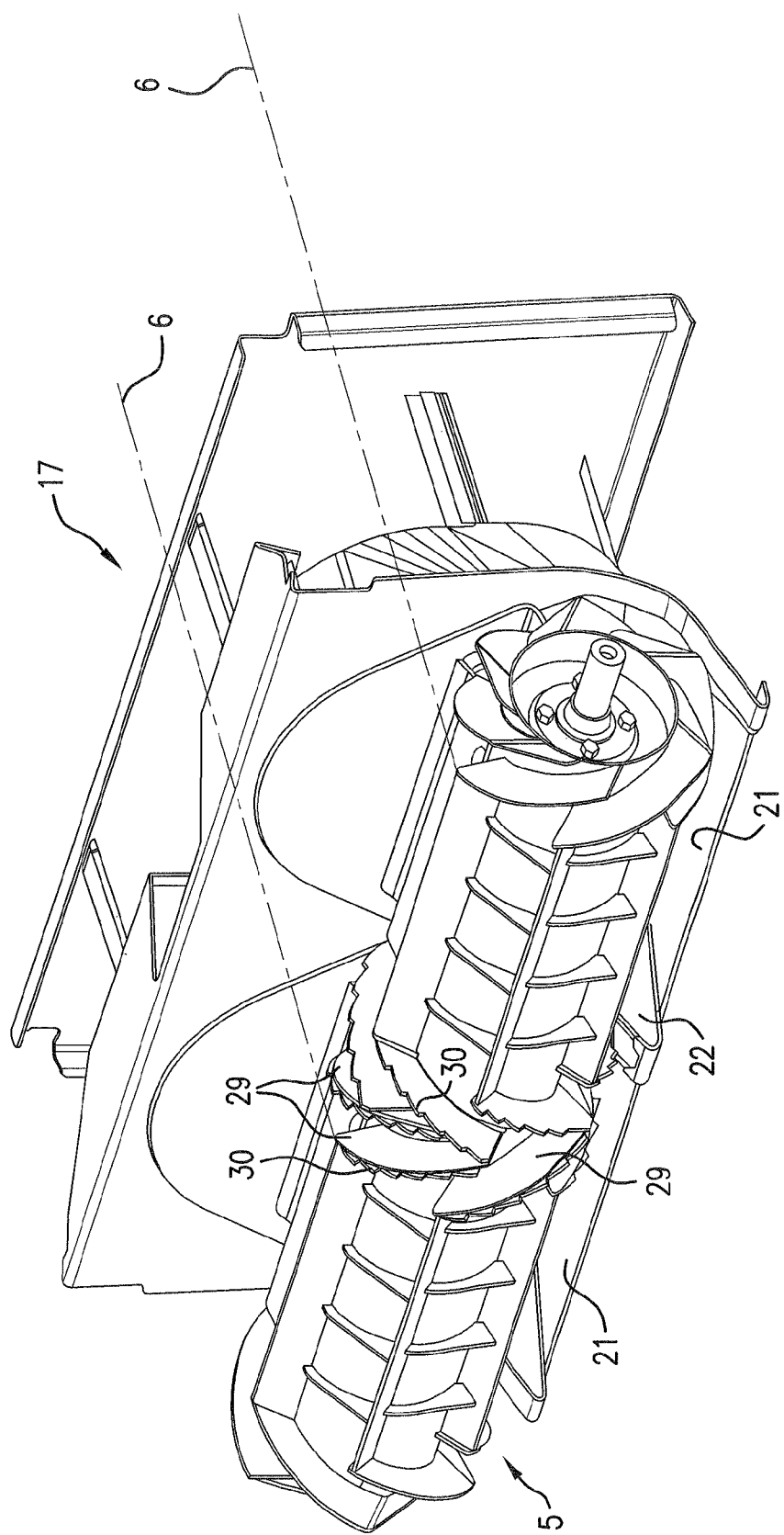
FIG. 2a presents a view of an inlet head housing of the combine harvester according to FIG. 1 at an angle from the front.
Figure 2B:
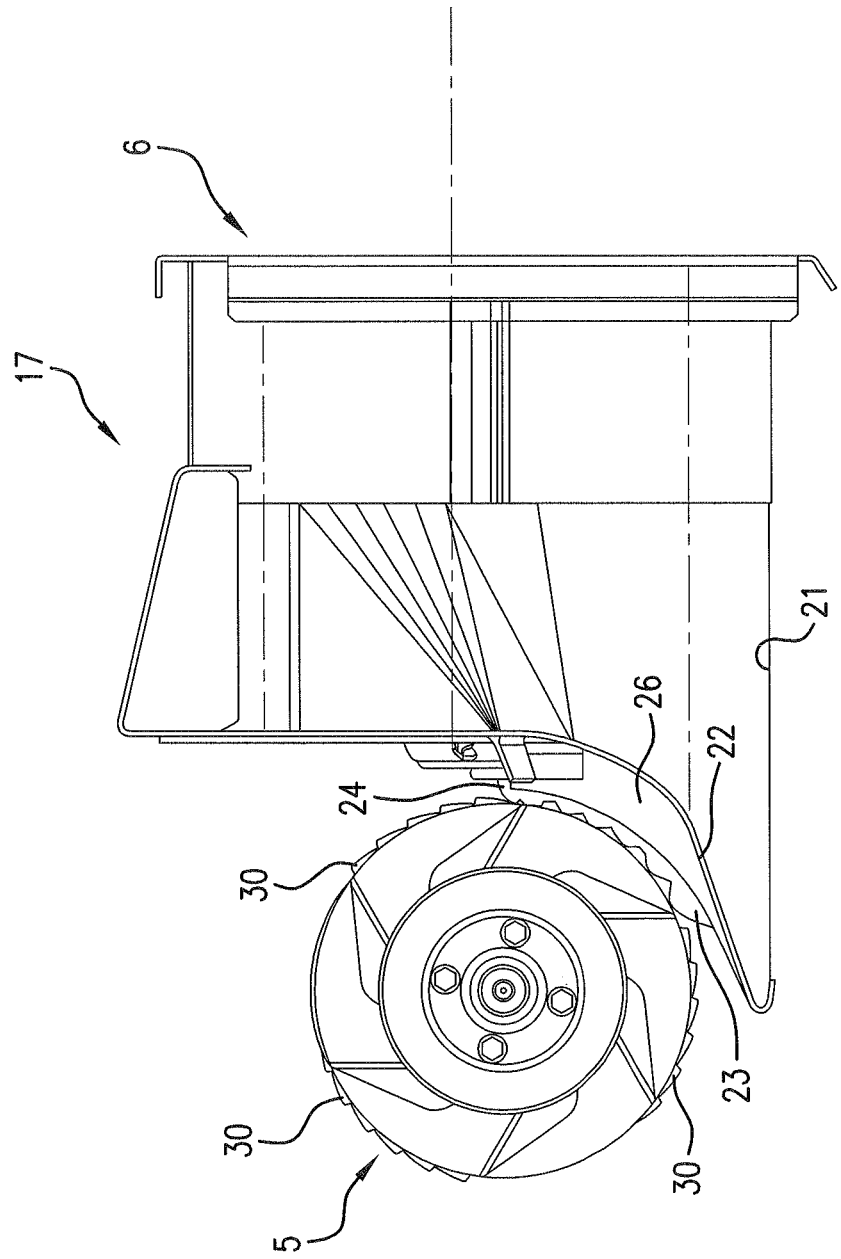

FIGS. 2a and 2b respectively show a view at an angle from the front and a side view of the inlet head housing 17 of the combine harvester 20. The inlet head housing 17 has, in each case, a flat inlet section 21, which extends along the width of the corresponding axial separating rotor 8 and extends, in sections, underneath the impeller 5. A ramp-shaped housing section 22 is located between the two inlet sections 21. The ramp-shaped housing section 22 has a substantially concave profile, as is evident in the side view in FIG. 2b. A substantially blade-shaped separating element 23 is arranged on the housing section 22. The separating element 23 extends substantially axially parallel to the housing section 22, wherein the profile thereof substantially corresponds to that of the housing section 22. The separating element 23 is preferably detachably arranged on the housing section 22 such that replacement can be easily carried out, e.g., due to wear. To this end, the separating element 23 can be screwable onto the inlet head housing 17, as indicated in FIG. 3.

Figure 3:
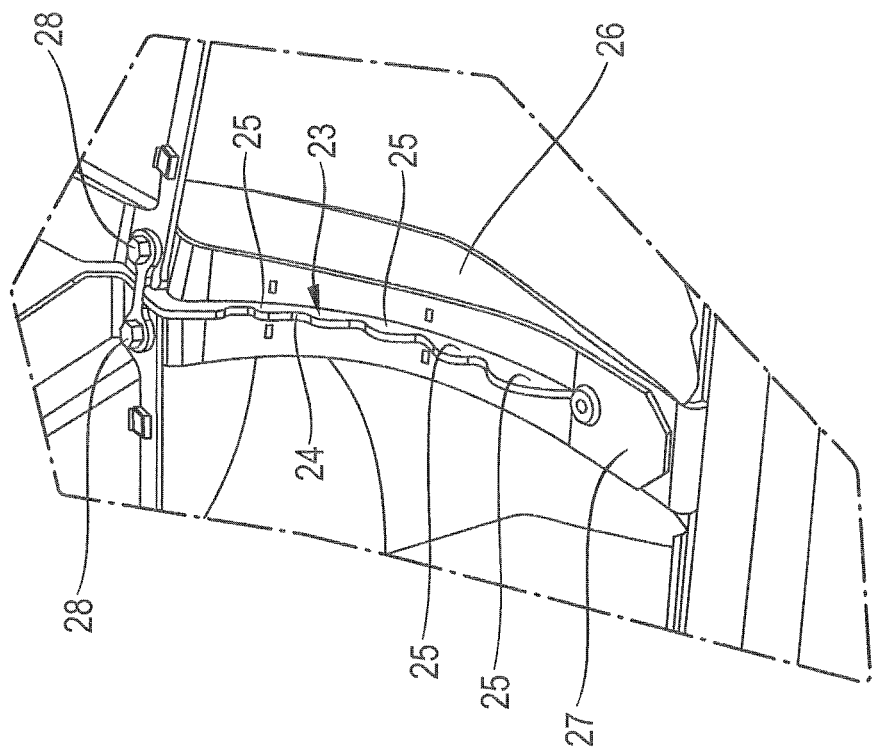
FIG. 3 presents a detailed view of a separating element.

The separating element 23 is blade-shaped, as is clear from FIG. 2b and FIG. 3, in particular. The separating element 23 extends perpendicularly to the surface of the housing section 22. In addition, the separating element 23 has a profiled separating edge 24. The separating edge 24 has a profile formed of a plurality of at least partially curved sections 25. As an alternative, embodiments also are conceivable, according to which the separating edge 24 has a saw tooth-shaped profile or a profile formed of a plurality of polygons. The height of the profiling decreases in the longitudinal direction of the separating element 23, i.e., in the circumferential direction of the impeller 5.

The impeller 5 has V-shaped guide plates 29 in the central region thereof. The guide plates 29 are arranged one behind the other in the circumferential direction of the impeller 5 and extend outwardly in the radial direction, proceeding from the circumferential surface of the impeller 5. The guide plates 29 have a profiling 30 on the outer edges thereof. The shape of this profiling is preferably matched to the shape of the profiling of the separating element 23. The separating element 23 interacts with the rotating impeller 5. In this context, the fixed separating element 23 is a type of counter blade for the profiled guide plate 29 of the impeller. The profiling 30 is provided directly on the outer edge of the guide plate 29. As an alternative, a profiled plate, which has a corresponding profiling 30 on the outer edge thereof, can be detachably fastened on the guide plates 29.

A base plate 26, on which the separating element 23 is arranged, is provided for detachable fastening on the ramp-shaped housing section 22. The base element 26 is detachably connected to the housing section 22 or to the inlet head housing 17 by means of screws 28. In the exemplary embodiment shown, the separating element 23 is arranged directly on the housing section 22. To this end, a wedge-shaped projection 26 is fastened on the housing section 22. It is also conceivable that the separating element 23 is arranged directly on the housing section 22.

LIST OF REFERENCE SIGNS 1 feeder
2 threshing unit
3 threshing drum
4 threshing concave
5 impeller
6 axial separating device
7 housing
8 axial separating rotor
9 ribs
10 separation concave
11 grain pan
12 return pan
13 chute
14 fan
15 perforated floor
16 guide pan
17 inlet head housing
18 helix
19 conveyor auger
20 combine harvester
21 inlet section
22 ramp-shaped housing section
23 separating element
24 separating edge
25 curved sections
26 wedge-shaped projection
27 base plate
28 screw
29 guide plate
30 profiling As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An inlet head housing for an axial separating device, comprising:
   a pair of separating rotors are arranged parallel to one another having a first end protruding, in sections, into the inlet head housing;
   a pair of flat inlet sections extending along a width of each of the respective separating rotors; and
   a ramp-shaped housing section positioned between the flat inlet sections formed with a substantially concave profile to at least partially support separation of a crop flow into two partial flows to the separating rotors;
   wherein a substantially blade-shaped separating element is arranged on the ramp-shaped housing section and extends substantially axially parallel thereto.

2. The inlet head housing according to claim 1, wherein a wedge-shaped projection is arranged on the ramp-shaped housing section.

3. The inlet head housing according to claim 2, wherein the separating element extends in sections along a width of the wedge-shaped projection.

4. The inlet head housing according to claim 1, wherein the separating element extends at least partially in sections in a longitudinal direction of the housing section.

5. The inlet head housing according to claim 1, wherein the separating element has a profiled separating edge.

6. The inlet head housing according to claim 5, wherein the separating edge has a profile formed from a plurality of at least partially curved sections.

7. The inlet head housing according to claim 5, wherein the separating edge has a saw tooth-shaped profile.

8. The inlet head housing according to claim 5, wherein the separating edge has a profile formed of a plurality of polygons.

9. The inlet head housing according to claim 5, wherein a profiling height decreases in a longitudinal direction of the separating element.

10. A self-propelled combine harvester comprising an inlet head housing, the inlet head housing comprising:
    a pair of separating rotors are arranged parallel to one another having a first end protruding, in sections, into the inlet head housing;
    a pair of flat inlet sections extending along a width of each of the respective separating rotors; and
    a ramp-shaped housing section positioned between the flat inlet sections formed with a substantially concave profile to at least partially support separation of a crop flow into two partial flows to the separating rotors;
    wherein a substantially blade-shaped separating element is arranged on the ramp-shaped housing section and extends substantially axially parallel thereto.

11. The self-propelled combine harvester according to claim 10, wherein a tangentially arranged impeller is assigned to the inlet head housing, wherein the impeller includes V-shaped guide plates arranged a circumferential direction in a central region thereof and extending radially outwardly.

12. The self-propelled combine harvester according to claim 11, wherein the V-shaped guide plates have a profiling on the outer edge thereof.

13. The self-propelled combine harvester according to claim 12, wherein the profiling embodies outer edge of the V-shaped guide plates.

14. The self-propelled combine harvester according to claim 12, wherein the profiling is provided on an outer edge of a guide plate of the V-shaped guide plates.

* * * * *